United States Patent
Gopfert et al.

(10) Patent No.: US 9,962,776 B2
(45) Date of Patent: May 8, 2018

(54) PRE-STRESSING TENDON SEPARATION DEVICE

(71) Applicant: Wobben Properties GmbH, Aurich (DE)

(72) Inventors: Heinrich Gopfert, Papenburg (DE); Christoph Graf, Hueckelhoven (DE)

(73) Assignee: Wobben Properties GmbH, Aurich (DE)

( * ) Notice: Subject to any disclaimer, the term of this patent is extended or adjusted under 35 U.S.C. 154(b) by 0 days. days.

(21) Appl. No.: 14/420,224

(22) PCT Filed: Jul. 8, 2013

(86) PCT No.: PCT/EP2013/064409
§ 371 (c)(1),
(2) Date: Feb. 6, 2015

(87) PCT Pub. No.: WO2014/023499
PCT Pub. Date: Feb. 13, 2014

(65) Prior Publication Data
US 2015/0283629 A1    Oct. 8, 2015

(30) Foreign Application Priority Data

Aug. 7, 2012   (DE) ........................ 10 2012 214 010

(51) Int. Cl.
*B23D 29/02*    (2006.01)
*B23D 29/00*    (2006.01)

(52) U.S. Cl.
CPC .................................. *B23D 29/002* (2013.01)

(58) Field of Classification Search
CPC ........ B21F 11/00; B21F 11/005; B21F 23/00; B21F 23/002; B21F 23/005; B21F 1/026; B23D 29/00; B23D 29/002
See application file for complete search history.

(56) References Cited

U.S. PATENT DOCUMENTS

| | | | | |
|---|---|---|---|---|
| 1,166,881 | A | * | 1/1916 | Anderson ............... A24F 13/26 30/113 |
| 1,452,634 | A | * | 4/1923 | Bell ..................... H02G 1/1258 81/9.51 |

(Continued)

FOREIGN PATENT DOCUMENTS

| CN | 2264630 Y | 10/1997 |
|---|---|---|
| CN | 2474248 A | 1/2002 |

(Continued)

OTHER PUBLICATIONS

English Translation of DE3347882.*
English Translation of FR1600789.*

*Primary Examiner* — Jennifer Swinney
(74) *Attorney, Agent, or Firm* — Seed Intellectual Property Law Group LLP (57) ABSTRACT

One or more embodiments concerns a stranded tensioning wire severing apparatus for stranded tensioning wires of steel, in particular stranded tensioning wires of prestressed concrete structures such as for example pylons of wind power installations, which is adapted to sever a bundle comprising a plurality of stranded tensioning wires in one working operation.

One embodiment proposes that the apparatus has a housing, a cutting body arranged within the housing, and a plurality of passage openings corresponding to the plurality of stranded tensioning wires, which extend through the housing, wherein the passage openings are each penetrated by a slot adapted to receive the cutting body, and the cutting body has one or more cutting edges and is drivable in the housing movably in a cutting direction relative to the passage openings in such a way that the cutting edge or edges completely transit through the passage openings.

14 Claims, 9 Drawing Sheets

(56) References Cited

U.S. PATENT DOCUMENTS

| | | | | |
|---|---|---|---|---|
| 1,663,189 A * | 3/1928 | Bergstrom | ............... | B21F 11/00 30/182 |
| 2,691,416 A * | 10/1954 | Williams | ................ | B23D 17/08 83/573 |
| 2,738,479 A * | 3/1956 | Gibson | ................ | H01R 4/2429 439/395 |
| 3,333,338 A * | 8/1967 | Burns | ..................... | B21F 11/00 30/131 |
| 3,771,207 A * | 11/1973 | Campbell | .......... | H05K 13/0092 30/194 |
| 4,597,179 A * | 7/1986 | Goforth | ................. | B23D 29/02 30/233 |
| 4,779,502 A * | 10/1988 | Hebert | ................... | B23D 15/14 30/228 |
| 5,413,086 A | 5/1995 | Trudeau | | |
| 7,316,688 B2 | 1/2008 | Matthys-Mark et al. | | |
| 7,673,392 B1 * | 3/2010 | Bzorgi | ................... | B23D 29/00 30/180 |
| 8,783,149 B2 | 7/2014 | Ali et al. | | |
| 2004/0025652 A1 * | 2/2004 | Marocco | ................ | B23D 23/00 83/13 |
| 2006/0059691 A1 * | 3/2006 | Wiste | ................... | H02G 1/1214 30/90.1 |
| 2010/0005849 A1 * | 1/2010 | College | ................. | B23D 29/00 72/416 |

FOREIGN PATENT DOCUMENTS

| | | | | |
|---|---|---|---|---|
| CN | 1799740 A | 7/2006 | | |
| DE | 1 909 278 A1 | 1/1970 | | |
| DE | 1502689 B1 * | 12/1971 | ............. | B23D 15/14 |
| DE | 3347882 A1 * | 5/1985 | ......... | H05K 13/0473 |
| DE | 3621939 C * | 8/1987 | | |
| EP | 1 101 557 A1 | 5/2001 | | |
| EP | 2508284 A1 | 10/2012 | | |
| ES | 2285274 T3 | 11/2007 | | |
| FR | 632080 A * | 12/1927 | ........... | B23D 29/002 |
| FR | 1600789 A * | 7/1970 | ........... | H02G 1/1214 |
| GB | 107671 A * | 7/1917 | ............. | B21F 11/00 |
| GB | 1102808 A | 2/1968 | | |
| GB | 1 331 939 A | 9/1973 | | |
| GB | 2464342 A | 4/2010 | | |
| JP | 55-82447 U1 | 6/1980 | | |
| JP | 6046836 A | 3/1985 | | |
| JP | 62271620 A * | 11/1987 | | |
| JP | 1-205913 A | 8/1989 | | |
| JP | 3162042 U | 7/2010 | | |
| SU | 236416 | 11/1969 | | |
| SU | 846009 A1 | 7/1981 | | |
| SU | 1152729 A | 4/1985 | | |
| SU | 1747226 A1 | 7/1992 | | |

* cited by examiner

PRE-STRESSING TENDON SEPARATION DEVICE

BACKGROUND

Technical Field

The present invention concerns a stranded tensioning wire severing apparatus for stranded tensioning wires of steel, in particular stranded tensioning wires of prestressed concrete structures such as for example pylons of wind power installations, which is adapted to sever a bundle comprising a plurality of stranded tensioning wires in one working operation.

Description of the Related Art

For reinforcing prestressed concrete structures, in particular in the field of prestressed concrete pylons, use is made of stranded tensioning wires which by applying a tensile force provide for tensioning and overall reinforcement of the building structure. Taking the example of wind power installations, those stranded tensioning wires are fixedly connected in the tensioned condition to the structure. In the case of wind power installations the fixed connection is achieved for example by the stranded tensioning wires being anchored to the foundation, in the condition of being combined together to form a bundle. Anchoring is preferably effected by the tensioned stranded tensioning wires being fixed by means of a tie anchor to the ceiling of the pylon basement. That fixing action is typically effected by the stranded tensioning wires, working in the pylon basement, being passed through a suitable opening in the basement ceiling, tensioned by a hydraulic ram device, and then fixed to the ceiling by means of a special anchor. Following the tensioning and fixing procedure, there is generally still an excess length of stranded tensioning wires of greater or lesser length, which hang down into the pylon basement from the ceiling thereof and from the fixing anchor. Those stranded tensioning wires which are always still in the form of a bundle have to be removed for reasons of working safety and for better access to the pylon basement.

As the stranded tensioning wires comprise high-strength material, in particular steel or a steel alloy, because of the mechanical demands thereon, severing of the stranded tensioning wires is technically demanding. Hitherto it has been necessary for the bundle of stranded tensioning wires to be severed by means of severing grinding machines. That involves a major generation of noise and sparking. In the state of the art that is perceived to be a disadvantage.

In the case of the stranded wire bundles which are involved here, the use of conventional stranded wire severing devices which are adapted to 'nip or pinch off' the stranded wires—this being shearing severing thereof—is not readily possible as such devices are only capable of severing individual stranded wires. The use of such devices would require the bundle of stranded wires to be unraveled and would necessitate the individual wires of the bundle being separated from each other to permit placement of the wire separating devices thereon. That has two further disadvantages: on the one hand the limited flexibility of the stranded wires means that a relatively large spacing is necessary relative to the anchor of the bundle of stranded wires in order to achieve the necessary separation of the individual wires. On the other hand, it is as good as impossible for all wires to be severed at the same level or in substantially the same cutting plane, whereby a large number of sharp-edged burrs occur at different heights in the pylon basement. Sealing off the severed stranded tensioning wires for the purposes of corrosion protection is also made difficult thereby. If sealing is intended by means of fitting a protective cap, that is sometimes impossible.

A further disadvantage that is encountered is that such a working operation is time-intensive.

BRIEF SUMMARY

One or more embodiments of the present invention is to provide a stranded tensioning wire severing apparatus, which in some embodiments may alleviate one or more of the above-indicated disadvantages. In one embodiment an apparatus has a housing, a cutting body arranged within the housing, and a plurality of passage openings corresponding to the plurality of stranded tensioning wires, which extend through the housing, wherein the housing and the passage openings are each penetrated by a slot adapted to receive the cutting body, the cutting body has one or more cutting edges and is drivable in the housing movably in a cutting direction relative to the passage openings in such a way that the cutting edge or edges completely transit through the passage openings. In that respect one working operation is used to mean positioning of the stranded tensioning wire severing apparatuses relative to the stranded tensioning wires and performing a cutting movement until the positioned stranded tensioning wires are completely severed without intermediate transposition of the stranded tensioning wire severing apparatus or intermediate re-positioning of the stranded tensioning wires. In this connection transiting is used to mean that a free cross-section defined by the passage opening is reduced to zero by the cutting body by the movement thereof in the slot, preferably by the cutting body being moved with the cutting edge or edges leading through the slot. Preferably the passage openings are spaced from each other in such a way that their arrangement corresponds to the arrangement of the stranded tensioning wires within the bundle thereof.

One embodiment of the invention makes use of the realization that, with an apparatus which has a preferably spatially closely adjacently arranged plurality of passage openings for stranded tensioning wires, the stranded tensioning wires can be severed by means of a shearing action by a cutting body guided in the stranded tensioning wire severing apparatus, without the stranded tensioning wire bundle having to be bent open to separate the stranded tensioning wires, for that purpose. Each passage opening is adapted to receive a respective stranded tensioning wire, the stranded tensioning wire is guided in the respective passage opening, and deflection away from the cutting body is prevented by means of the passage opening. Positioning of the stranded tensioning wires in a respective passage opening also ensures that, with the stranded tensioning wire severing apparatus, the cutting body can pass through all stranded tensioning wires in a preferably continuous cutting operation, without the stranded tensioning wire severing apparatus or the stranded tensioning wires themselves having to be re-positioned in the meantime. That results in the production of a uniform cutting image in such a way that the stranded tensioning wires are all severed at one level. Preferably the passage openings are arranged uniformly along a predetermined circular periphery in the housing. The circular periphery preferably corresponds to that circular periphery portion which also defines the bundle of stranded tensioning wires and which corresponds to that circular periphery portion in which the stranded tensioning wires are passed through the anchoring means provided for fixing to the structure.

In a further preferred embodiment the cutting body has a separate cutting portion with a cutting edge for each of the passage openings. It has been found that wear of the wearing body overall becomes less if there is a separate cutting portion for each passage opening.

Particularly preferably the cutting edges of the cutting portions are displaced relative to each other in the cutting direction in such a way that upon movement of the cutting body a number of passage openings are simultaneously transited by the cutting edges, which is less than the total number of the plurality of passage openings. That achieves the advantage that a reduced drive force is sufficient for movement of the cutting body in the cutting direction, than would be the case if all stranded tensioning wires were to come into contact with the cutting body simultaneously. In a preferred embodiment the stranded tensioning wires are firstly severed in paired relationship by means of the cutting body by suitable displacement of the cutting edges relative to each other in the cutting direction. Preferably at no moment in time are all stranded tensioning wires in contact with the cutting body, but there are only ever some thereof that are in such contact.

In a preferred development the cutting edges are displaced relative to each other in the cutting direction in such a way that upon movement of the cutting body in the cutting direction a number of first passage openings is firstly transited by the cutting edges, and a number of second passage openings is transited by the cutting edges as soon as the first passage openings are transited to 50% or more of the diameter in the cutting direction. Preferably the displacement of the cutting edges in the cutting direction is in a range of 50% to 100%). An advantage of the partial overlap of severing by first and second passage openings is that this permits a steadier variation in force in the drive of the cutting body as the cutting body does not jerk quickly forwards between severing of the first and second numbers of stranded tensioning wires. The advantage of a 50% overlap is that the contact surface which the cutting edges have with the stranded tensioning wires to be arranged in the passage opening remains constant in the cutting operation, which results in a uniform variation in force.

With a further preferred embodiment the cutting edges are displaced relative to each other in the cutting direction in such a way that upon movement of the cutting body a number of third passage openings is transited by the cutting edges, as soon as the second passage openings are transited to 50% or more, preferably 50% to 100%, particularly preferably 50%, of the diameter in the cutting direction.

In both the foregoing embodiments, these provide for a cutting operation which is in two or more stages or three or more stages, with a substantially steady pattern in respect of the cutting force between the individual stages.

In a further preferred embodiment of the invention the passage openings at both sides of the slot penetrating through them have guide portions for rectilinearly guiding the stranded tensioning wires passed through them. By virtue of the inherent stresses prevailing in the stranded tensioning wires, they have a tendency to deflect towards the side immediately after severing of the individual wires of the stranded tensioning wires when the cutting body passes in the cutting movement through the stranded wires. Such deflection is prevented by the provision of guide portions on both sides of the slot for receiving the cutting body, which means that a substantially rectilinear cutting image which is formed preferably perpendicularly to the passage openings is produced when the slot and the passage openings are arranged perpendicularly to each other.

Preferably, with the stranded tensioning wire severing apparatus according to the invention, in a further preferred embodiment, the cutting body is movable exclusively with a translatory movement in the cutting direction and guided substantially play-free in the slot. In that respect substantially play-free guidance is used to mean that there is a gap of 0.3 mm or less between the cutting body and the slot accommodating it.

In a further preferred embodiment of the stranded tensioning wire severing apparatus the cutting body is coupled to a drive means or drive device by means of a screw connection. The drive means preferably has a piston which is arranged within a piston chamber of the housing and which can be hydraulically actuated by means of pressurization of the piston chamber. Particularly preferably the screw connection is arranged perpendicularly to the cutting direction, which means in other words that the longitudinal axis of the screws used extends perpendicularly to the cutting direction.

In a preferred embodiment at an (end) side in the cutting direction the housing has a preferably slot-shaped opening through which the cutting body is movable partially in the cutting movement and through which the cutting body is removable in a condition of being uncoupled from the drive means. Preferably the cutting body is removable by hand in the uncoupled condition.

In a further preferred embodiment the screw connection defines a screw pattern, in other words a bore layout, and provided in the housing is a through bore pattern which corresponds to the screw pattern and which can be oriented in aligned relationship with the screw pattern by the cutting body being moved into a predetermined position within the housing. The predetermined position is preferably one of the two end positions of the cutting body, that is to say a position of the cutting body, in which it is retracted to the maximum or extended to the maximum. The diameter of the through bore is preferably adapted to the respective screw head diameter of the screws provided for coupling the cutting body to the drive. The aligned orientability of the through bores with the screw pattern of the screw connection means that the corresponding screws can be released and the cutting body can be uncoupled from the drive means, without having to completely open the housing of the stranded tensioning wire severing apparatus. It is then possible to change the cutting body, as a simple operation which takes only a small amount of time, through the opening which is provided at the side that is in the cutting direction and which is preferably a prolongation of the slot for receiving the cutting body.

In a further preferred embodiment the stranded tensioning wire severing apparatus has a slide rail which is arranged within the slot adjacent to the cutting body and which is adapted to guide the cutting body in the lateral direction. In that respect lateral direction is used to mean a direction transverse relative to the cutting direction of the cutting body.

In one embodiment, the cutting body is in the form of cutting plate and has a top side and an underside substantially parallel to the top side, the cutting edge or edges are arranged in a respective aperture respectively extending through the cutting body and the cutting edge or edges are at a smaller spacing relative to the top side than relative to the underside, or are at a smaller spacing relative to the underside than relative to the top side. That arrangement of the cutting edge relative to the top side or the underside defines an eccentric arrangement of the cutting edge in relation to the center line between the top side and the underside of the cutting plate. It has been found that squashing of the stranded tensioning wires, which inevitably occurs upon shearing severing by means of the cutting edge or edges surprisingly turns out to be less if the cutting edge is not arranged centrally. Particularly preferably the cutting edge or edges is or are arranged at the top side or the underside. In that case, relative to the respective side of the cutting edge, which is not at the top side or underside but is directed into the aperture, there is formed an inclinedly extending cutting portion, in the direction of the respective other side. Preferably the angle of such a cutting portion relative to the top side or underside is in a range of 5° to 30° and particularly preferably is 30°.

It has been found that, in the above-mentioned range, a surprisingly good compromise is achieved between the required cutting force, the squashing effect produced, and cutting edge wear that has to be tolerated.

Further preferably the cutting edge or edges is or are of a circular arcuate configuration. The arcuate configuration is preferably defined in a plane parallel to the cutting direction. Because the configuration of the cutting edge or edges is in the form of a circular arc, and having regard to the fact that the stranded tensioning wires are also of a substantially circular cross-section, a larger surface of the cutting edge comes into contact with the stranded tensioning wire in the cutting operation more quickly, which in turn has a positive effect on wear of the cutting edge. Particularly preferably the curvature of the cutting edge in the plane parallel to the cutting direction substantially corresponds to the curvature of the wall of the passage openings or substantially corresponds to the curvature of the surface of the stranded wires.

In a preferred alternative the cutting edge or edges is or are of a wedge-shaped configuration.

In a further preferred embodiment of the stranded tensioning wire severing apparatus the passage openings for the stranded tensioning wires and the slot for receiving the cutting body are provided in a preferably cylindrical first portion of the housing which can be removed from a second portion of the housing by means of a coupling, preferably a screw coupling including a union nut, and can be coupled to the second portion. The second portion of the housing in that case preferably has the piston chamber.

One embodiment further concerns a cutting body for a stranded tensioning wire severing apparatus for stranded tensioning wires of steel, in particular stranded tensioning wires of prestressed concrete structures such as for example pylons of wind power installations, which is adapted to sever a bundle comprising a plurality of stranded tensioning wires in one working operation, which is adapted to be received in a housing of a stranded tensioning wire severing apparatus according to one of the preferred embodiments described hereinbefore, which has one or more cutting edges and is drivable movably in a cutting direction relative to a plurality of passage openings in a housing of the apparatus in such a way that the cutting edge or edges completely transit the passage openings.

The cutting body according to the invention is preferably designed in accordance with the features which have been described hereinbefore in relation to the stranded tensioning wire severing apparatus.

For the advantages of the configuration according to the invention of the cutting body attention is directed to the foregoing description.

BRIEF DESCRIPTION OF THE SEVERAL VIEWS OF THE DRAWINGS

The invention is described in greater detail hereinafter by means of a preferred embodiment by way of example with reference to the accompanying Figures in which.

DETAILED DESCRIPTION

In regard to identical parts, the same references are allocated. In that respect, in relation to a respective one of the Figures, attention is also directed to the description of the other Figures by way of reference insofar as technical details are involved.

Figure 1:
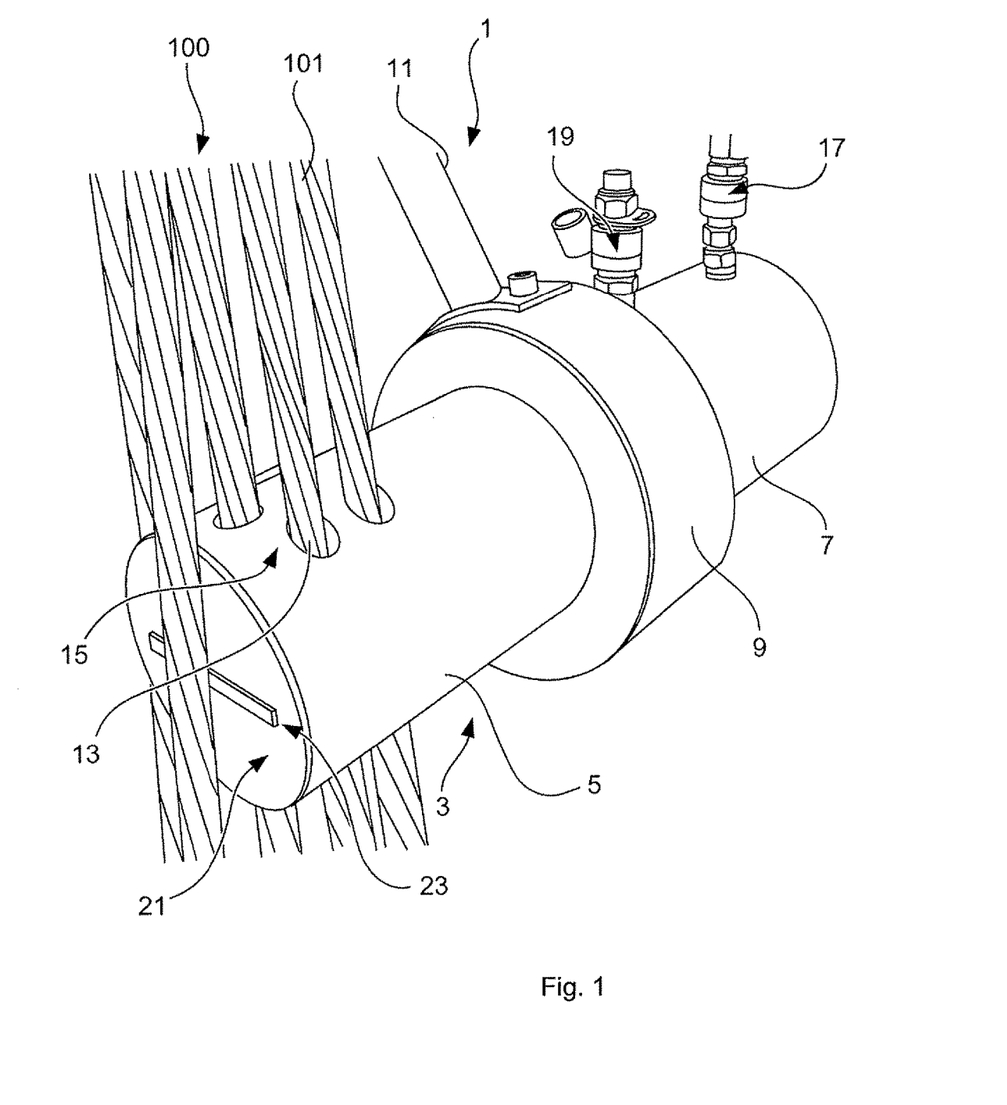
FIG. 1 shows a perspective view of the stranded tensioning wire severing apparatus according to the preferred embodiment of the invention.

FIG. 1 shows a respective view of a stranded tensioning wire severing apparatus 1 according to one embodiment of the invention. The stranded tensioning wire severing apparatus 1 has a housing 3. The housing 3 has a first portion 5 and a second portion 7. The first portion 5 of the housing 3 is connected to the second portion 7 of the housing 3 by means of a union nut 9. The union nut 9 has a plurality of handles (one is shown) 11.

The first portion 5 of the housing 3 has a pattern 15 comprising a plurality of passage openings 13. A stranded tensioning wire 101 of a bundle 100 of stranded tensioning wires is passed into and through each of the passage openings 13 (for the sake of clarity only one is provided with references). Some stranded tensioning wires are shown in FIG. 1 in the condition of not being passed through the openings, for illustration purposes. In general all stranded tensioning wires are passed through the openings and cut.

A slot 23 is provided at an (end) side 21 of the housing 3, said slot being in the cutting direction. A cutting body 29 can extend outwardly through the slot 23 in the course of a cutting movement. See in that respect FIG. 2 and FIGS. 5 to 7.

Figure 2:
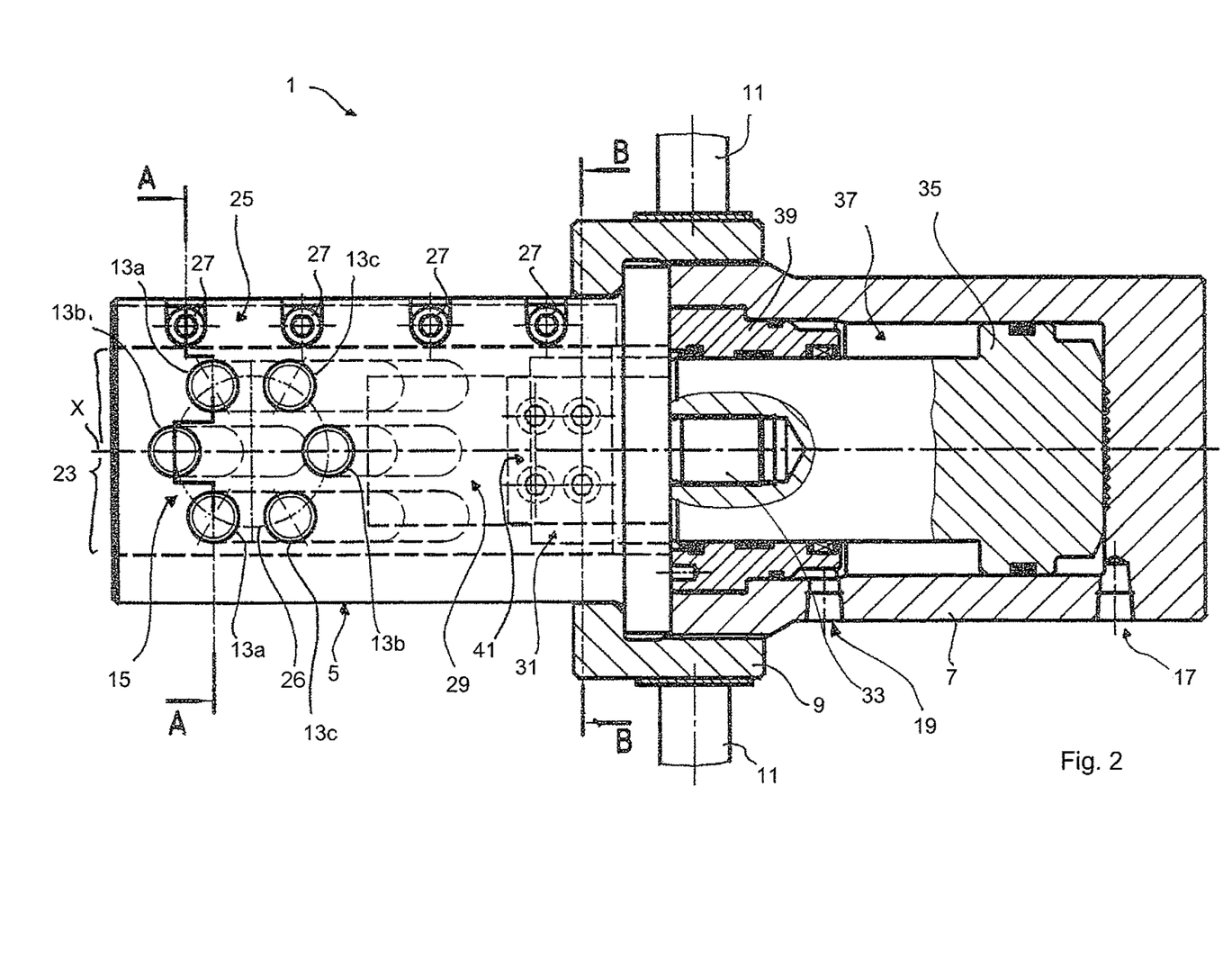
FIG. 2 shows a cross-sectional view of the stranded tensioning wire severing apparatus of FIG. 1.

FIG. 2 shows a cross-sectional view of the stranded tensioning wire severing apparatus 1 of FIG. 1. It can be seen from FIG. 2 that the slot 23 extends completely in the direction of an axis X which defines the cutting direction through the first portion 5 of the housing 3. A cutting body 29 is arranged within the slot 23. The cutting body 29 is connected to an adaptor 31 by means of a screw means or screws defining a pattern 41. The adaptor 31 is in turn connected to a piston 35 by means of a threaded pin 33.

The first portion 5 of the housing further has a key 25 for lateral guidance of the cutting body within the slot 23. The key 25 is connected to the housing by means of a plurality of screw connections 27.

The passage openings 13 in the first portion 5 of the housing are distributed uniformly along the periphery of a circle 26. The diameter of the circle 26 preferably corresponds to the part-circle diameter of the bundle of stranded tensioning wires, with which it is passed through a fixing anchor for a foundation. For example that diameter can be 57.5 mm, when six stranded wires are used. The diameter is preferably different for other bundles of stranded tensioning wires which for example comprise nine or twelve wires. Preferably for that reason there is provided for each installation situation, that is to say for each installed bundle of stranded wires, a first portion 5 which is specifically produced for that purpose, for a housing, which portion can be fitted and replaced by temporarily removing the union nut 9.

Figure 8A:
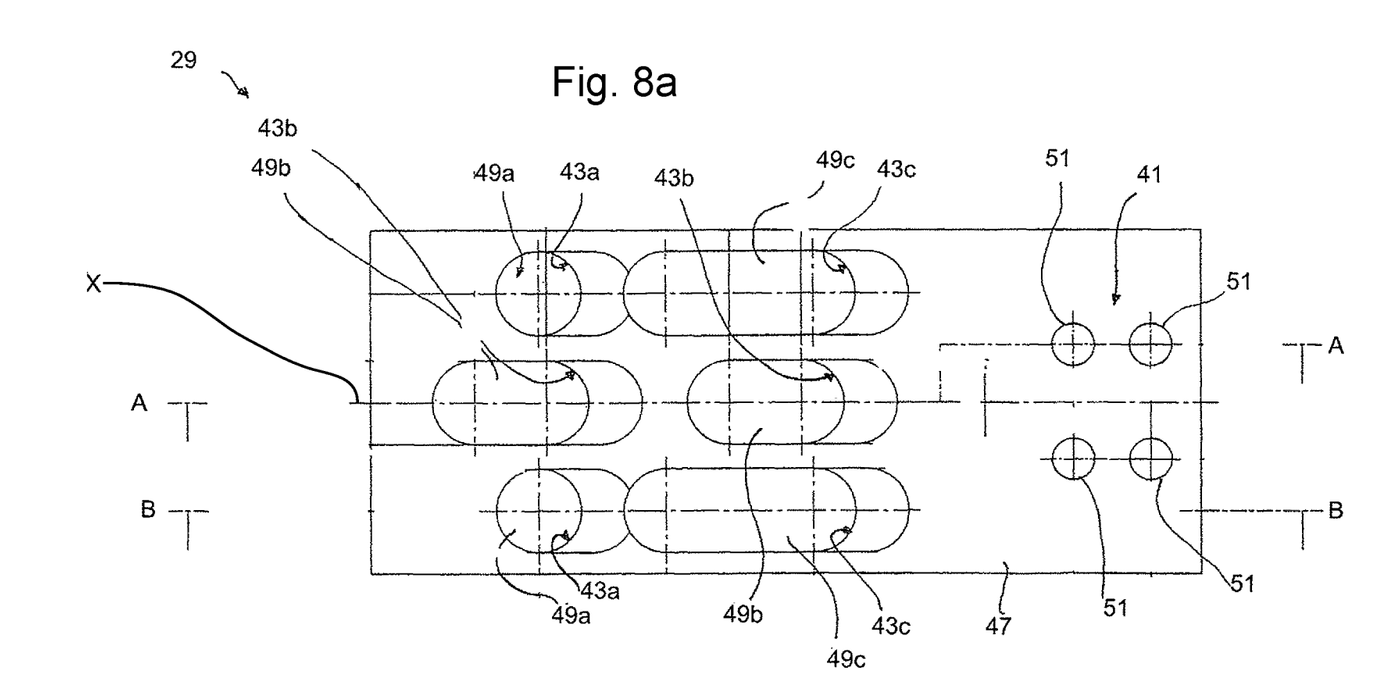
FIGS. 8a and 8b show various views of a cutting body according to the invention.
Figure 8B:
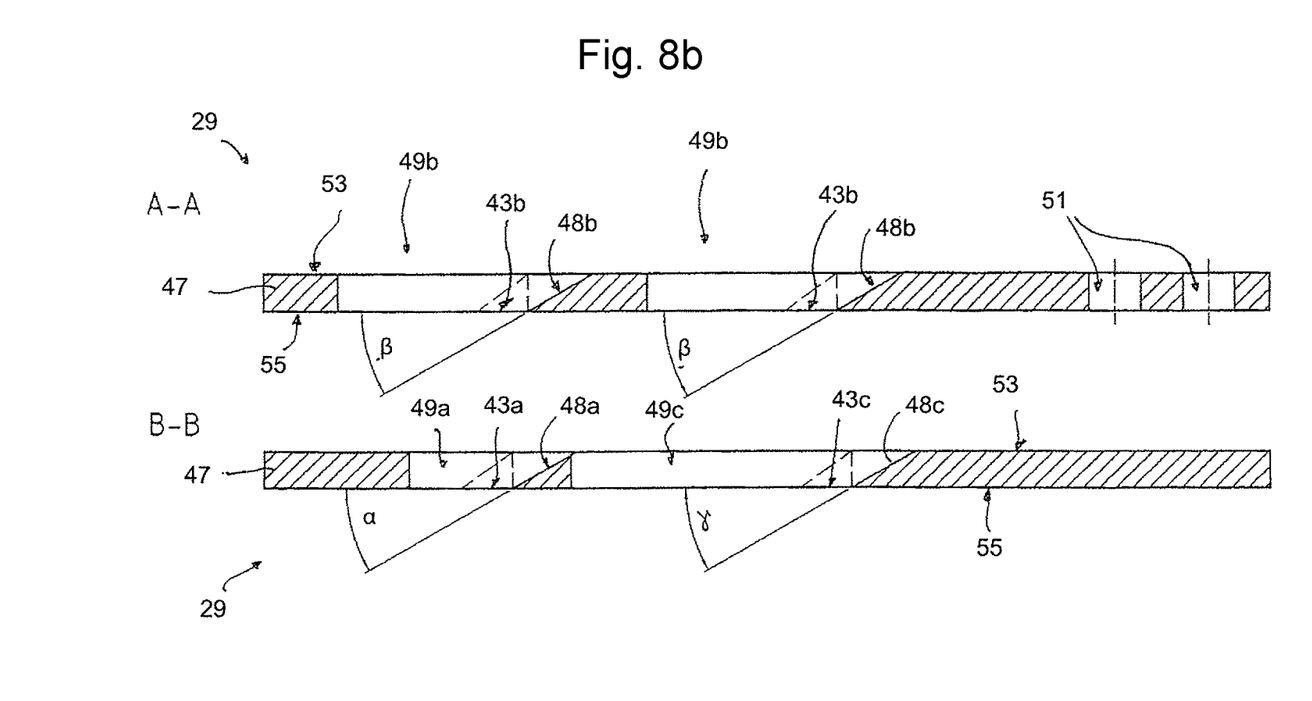

The cutting body 29 is also shown in detail in FIGS. 8a and b. For the sake of clarity further description is postponed until that point.

The piston 35 is arranged in the second portion 7 of the housing and is movable guidedly in a piston chamber 37. The piston chamber 37 has two pressurizable sub-chambers respectively connected to a fluid connection 17, 19. Actuation of the piston is thus effected by means of pressurization in both directions of movement. An alternative option would be for the piston to be equipped with a spring return means or similar return means so that pressurization is required only in one direction of movement. A double piston as shown here however is preferred because in that way the drive force does not additionally have to overcome the resistance of a possible return component. In its region towards the first portion 5 of the housing, the piston 35 is guided in a support ring 39. The support ring 39 is supported against a shoulder in the second portion 7 of the housing and can be changed as required.

In accordance with the present embodiment, the passage openings in the pattern 15 are subdivided into a first number of passage openings 13a, a second number of passage openings 13b and a third number of passage openings 13c. The significance of that subdivision in regard to the cutting operation is described in greater detail in FIGS. 5 to 7.

Figure 3:
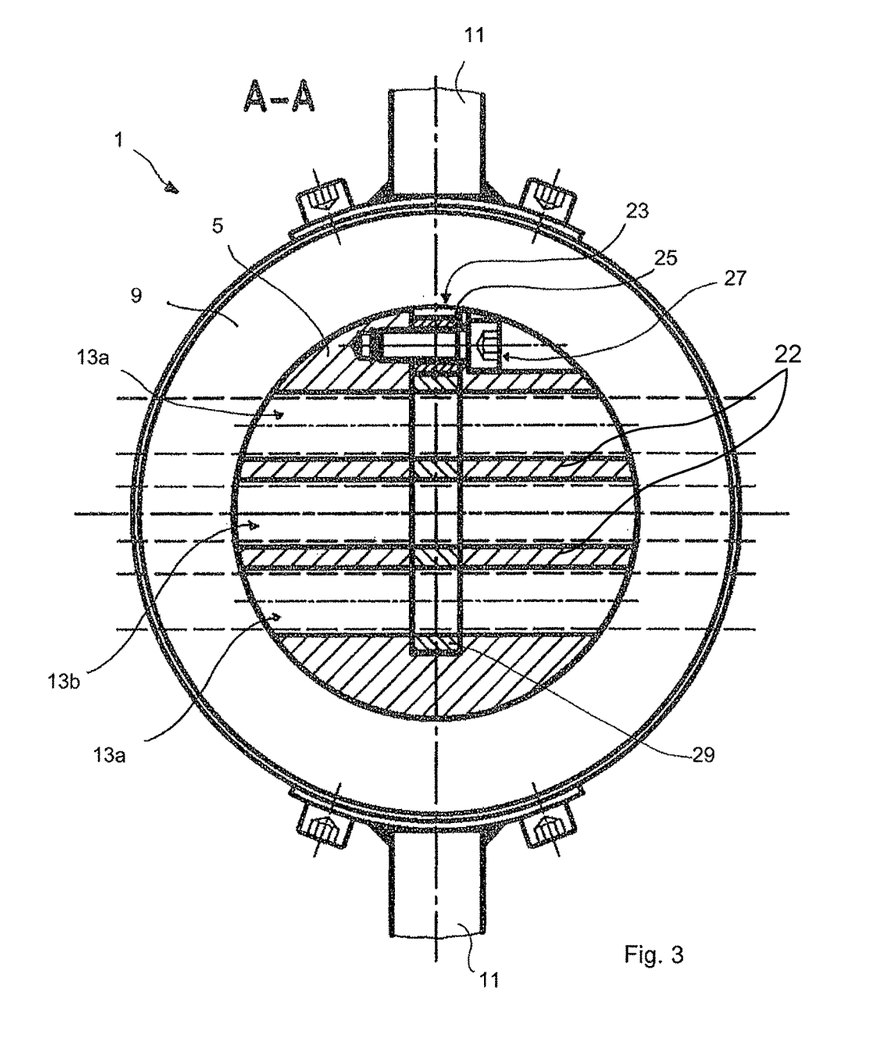
FIG. 3 shows a multi-stage cross-sectional view of a side projection of FIG. 2 along line A-A.
Figure 4:
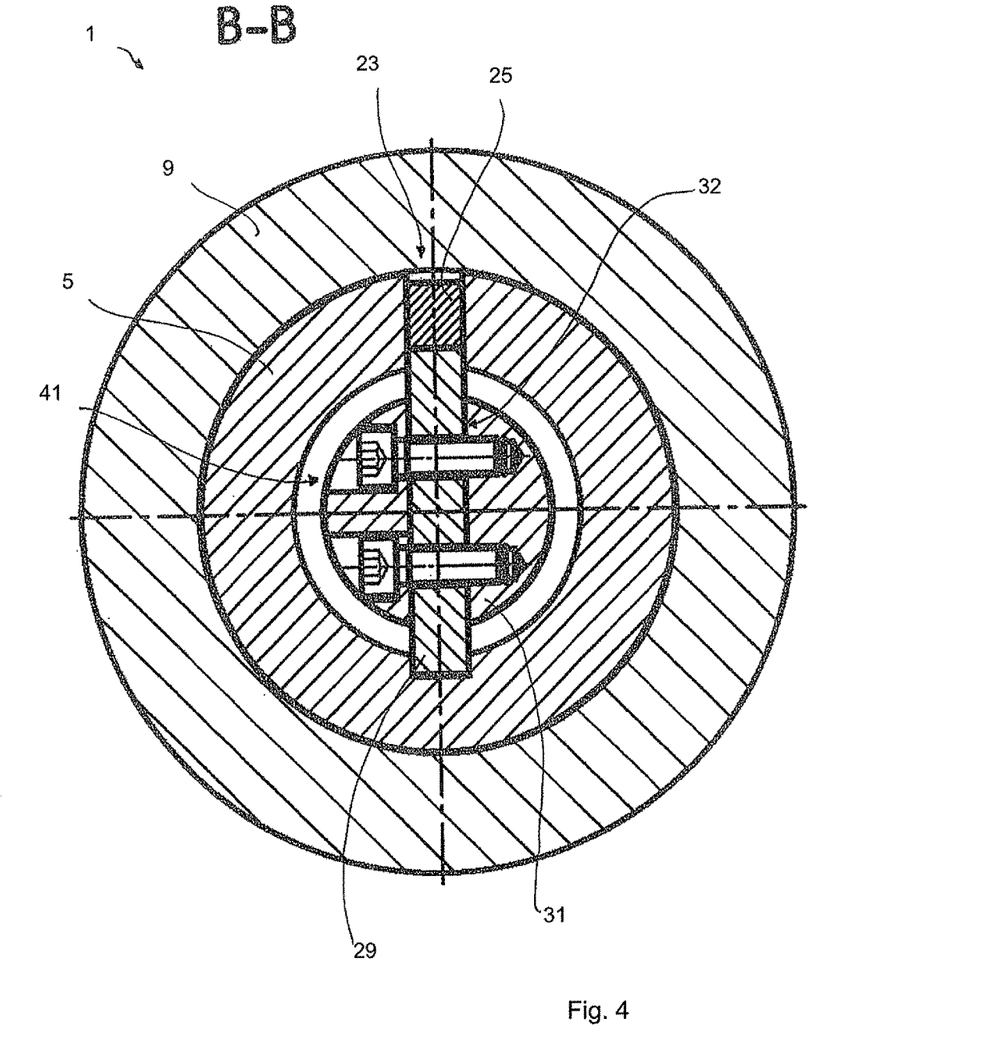
FIG. 4 shows a cross-sectional view of a side projection of FIG. 2 along line B-B.

Supplemental to the view shown in FIG. 2, FIGS. 3 and 4 show additional views. In addition to what has already been stated in relation to FIG. 2, FIG. 3 in particular clearly shows how the cutting body 29 is received within the slot 23 in the first portion 5 of the housing. Lateral guidance is ensured by the key 25 which is arranged immediately adjoining the cutting body 29 in the slot 23 and is fixed by the plurality of screws 27. The stepped section along line A-A in FIG. 2 is through the two first passage openings 13a and one of the two second passage openings 13b.

FIG. 4 shows how the cutting body 29 is received in the adaptor 31. The adaptor 31 has a slot 32 which is provided in alignment with the slot 23 in the first portion 5 of the housing. The cutting body 29 is received in the slot 32 and fixed by means of the screw connection provided in the pattern 41. The force is transmitted from the piston 35 (FIG. 2) to the cutting body 29 by means of the adaptor 31.

Before entering hereinafter into the description of the progress of a cutting operation with the stranded tensioning wire severing apparatus 1 according to one embodiment of the invention (FIGS. 2 and 5 to 7), the structure of the cutting body will be described with reference to FIGS. 8a and b.

In the preferred embodiment the cutting body 29 has a respective aperture 49 (49a, 49b, 49c) for each passage opening 13 (13a, 13b, 13c) in the first portion 5 of the housing. As, in the illustrated embodiment, there are six passage openings in the housing, the cutting body 29 similarly has two first apertures 49a, two second apertures 49b and two third apertures 49c. The apertures 49a, 49b, 49c extend through a cutting plate 47. A cutting edge 43a, 43b, 43c is provided within each aperture. Viewing in a direction perpendicular to the axis X of the cutting movement of the cutting body 29, each cutting edge is curved in the shape of a circular arc, wherein the diameter of the circular arc corresponds to that of the aperture 49a, 49b, 49c, or the diameter of the passage openings 13a, 13b, 13c. In that respect production tolerances are obviously to be expected, but they can be disregarded for the following considerations. The end, respectively in opposite relationship to the cutting edge 43a, 43b, 43c, of the apertures 49a, 49b, 49c (in the direction of the axis X) corresponds to the pattern 15 of the passage openings 13 in the housing of the stranded tensioning wire severing apparatus 1. Preferably that part of the apertures in a first end position of the cutting body 29 is oriented in aligned relationship with the passage opening 13, within the housing 3. In that position the cutting edges 43a are oriented in aligned relationship with the passage openings 13a so that, upon the onset of movement of the cutting body 29, contact is immediately made between the cutting edges 43a and the stranded tensioning wires introduced into the passage openings 13a.

The passage openings, such as passage opening 13b in FIG. 3, have guide portions 22 for rectilinearly guiding the stranded tensioning wires passed therethrough.

In comparison therewith the cutting edges 43b in the second apertures 49b are displaced in opposite relationship to the cutting direction which is to be interpreted as being directed towards the left in the direction of the axis X in FIG. 8a, so that the apertures 49b are longer in the direction of the axis X, in comparison with the apertures 49a. In comparison therewith the third apertures 49c are even longer in the direction of the axis X, whereby the cutting edges 43c of the third aperture 49c are displaced still further in opposite relationship to the cutting direction.

The length of the respective displacement of the second cutting edges 43b and the third cutting edges 43c relative to the first cutting edges 43a, and in each case in relation to the pattern 15 of the passage openings 13 as well as the cutting direction (in the direction of the axis X) determines at what moment in time which cutting edge comes into contact with the stranded tensioning wires introduced into the respective passage opening and passes through the passage opening. In the illustrated structure the displacement in each case is so selected that the first cutting edge 43a completely transits the first passage opening 13a before the second cutting edge 43b transits the respective second passage opening 13b. Similarly the third cutting edge 43c in each case is displaced to such an extent that the second cutting edge respectively completely transits the second passage opening before the third cutting edge 43c transits the third passage opening 13c associated therewith. Particularly preferably the respective displacement is such that the movement across the (n+1)-th passage opening by means of the (n+1)-th cutting edge is begun as soon as the (n)-th cutting edge has passed through the (n)-th passage opening in the direction of the axis X, to an amount which is in a range of between 50% and 100%.

FIG. 8b shows the plate-shaped structure of the cutting body 29. The cutting body 29 has a cutting plate 47. The cutting plate 47 has a top side 53 and an underside 55 substantially parallel to the top side 53. The cutting edges 43a, 43b, 43c of the apertures 49a, 49b, 49c are respectively arranged at the underside 55. Thus the cutting edges 43a, 49b, 49c are eccentric with respect to the center of the cutting plate 47. In this respect the expression 'center of the cutting plate' is used to mean the line of symmetry between the top side 53 and the underside 55 of the cutting plate 47.

The apertures 49a, 49b, 49c respectively extend completely through the cutting plate 47. Starting from the respective cutting edge 43a, 43b, 43c, an inclinedly extending cutting portion 48a, 48b, 48c is formed in the apertures. The first cutting portion 48a extends at an angle α relative to the underside 55 delimiting the cutting edge 43a. The second cutting surface 48b extends at an angle β relative to the underside 55 delimiting the cutting edge 43b. Similarly the third cutting edge 48c extends at an angle γ relative to the underside 55 delimiting the cutting edge 43c. Preferably the angles α, β and γ are each of the same size. The angle α, β, γ of the cutting surfaces 48a, 48b, 48c is preferably each in a range of between 10° and 40° and particularly preferably is 30°.

Referring to FIGS. 2 and 5 to 7, the operation of severing a bundle of stranded tensioning wires consisting of six stranded tensioning wires in one operation is illustrated there. In the condition shown in FIG. 2 the piston 35 and therewith the cutting body 25 are in a first end position corresponding to a maximum retracted condition. In that condition the cross-section of all passage openings 13a, 13b, 13c is completely free. The cutting edges 43a of the cutting body 29 (see FIG. 8a) are however already oriented with the wall of the passage openings 13a.

Figure 5:
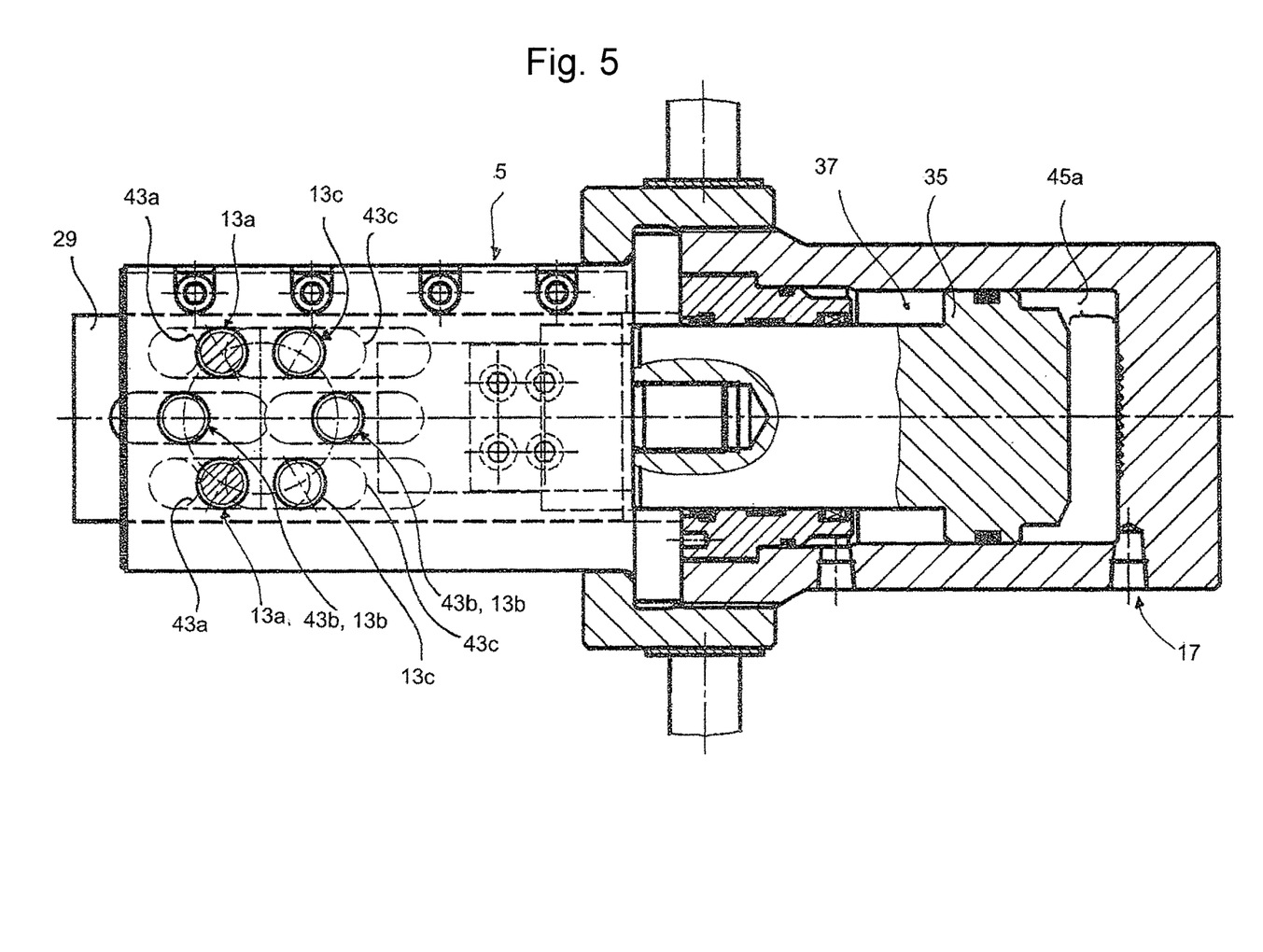
FIG. 5 shows a cross-sectional view of FIG. 2 in an alternative operating condition.
Figure 6:
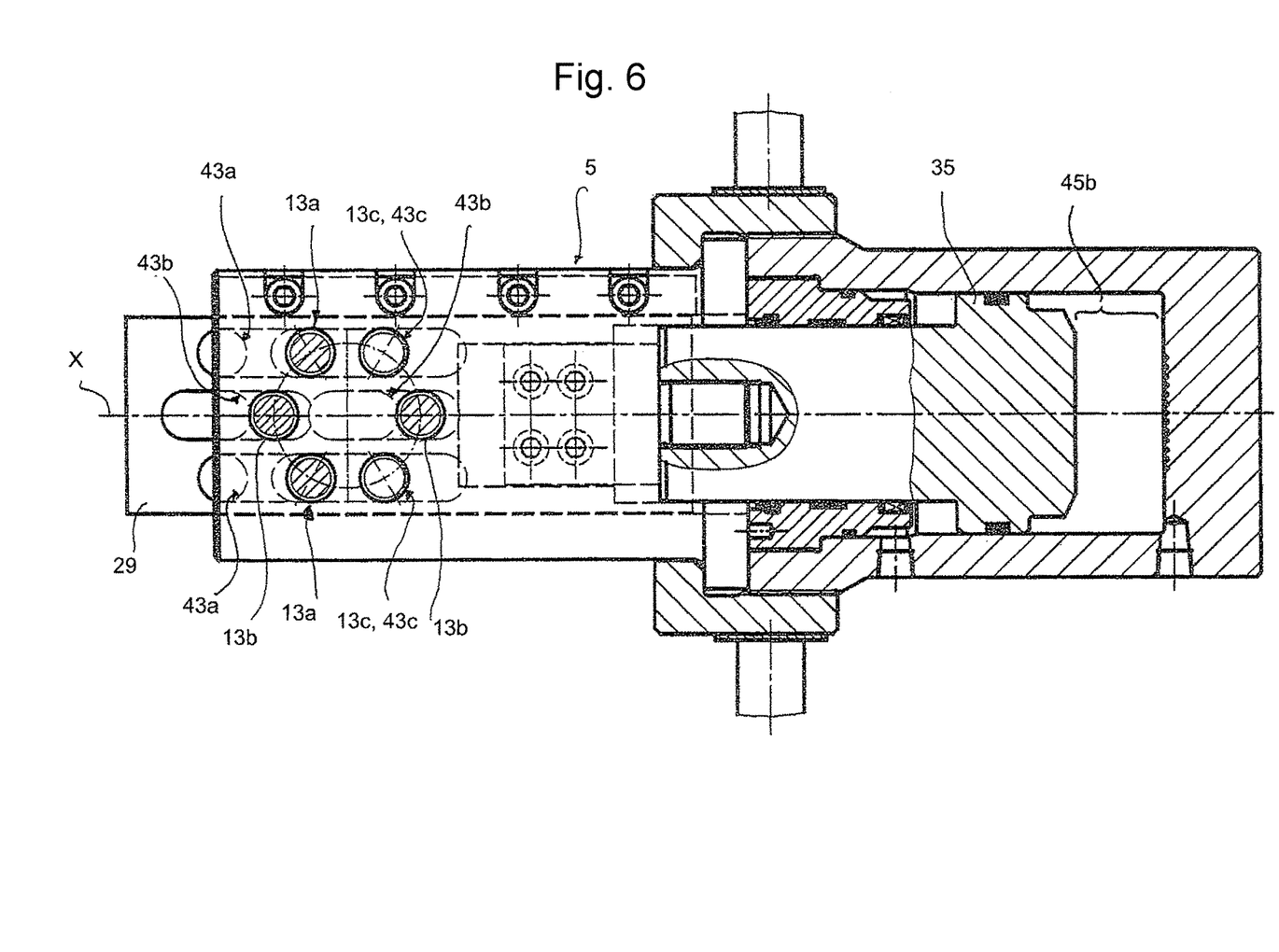
FIG. 6 shows a cross-sectional view of FIG. 2 and FIG. 5 in a further alternative operating condition.

After positioning of the stranded tensioning wire severing apparatus 1 and after passing the stranded tensioning wires through the passage openings 13 the piston 35 is acted upon with pressure by means of the pressure fluid connection 17 and the piston 35 together with the cutting body 29 moves from the condition in FIG. 2 into the condition in FIG. 5. In that case the piston 35 moves by a distance 45a. In the condition shown in FIG. 5 the cutting edges 43a have completely transited the passage openings 13a and severed the stranded tensioning wires disposed therein. The second cutting edges 43b are oriented directly with the wall of the second passage openings 13b while the third cutting edges 43c are still spaced a good distance from the passage openings 13c. Upon continuation of the movement of the cutting body 29 in the cutting direction of the axis X contact is immediately made between the second cutting edges 43b and the stranded tensioning wires in the second passage openings 13b. FIG. 6 shows a second condition in the working operation. In this condition the second cutting edges 43b have also completely transited the respective second passage openings 13b associated therewith, and severed the stranded tensioning wires therein. In this case the piston 35 together with the cutting body 29 is extended in the direction of the axis X by the distance 45b relative to the first end position shown in FIG. 2. In the conditions of FIGS. 5 and 6 the cutting body already extends partially outside the first portion 5 of the housing.

In the condition shown in FIG. 6 the third cutting edges 43c are oriented directly with the third passage openings 13c so that, upon a further movement of the cutting body 29 in the direction of the cutting movement (towards the left in FIG. 6), they are brought into contact directly with the stranded tensioning wires in the third passage openings.

Figure 7:
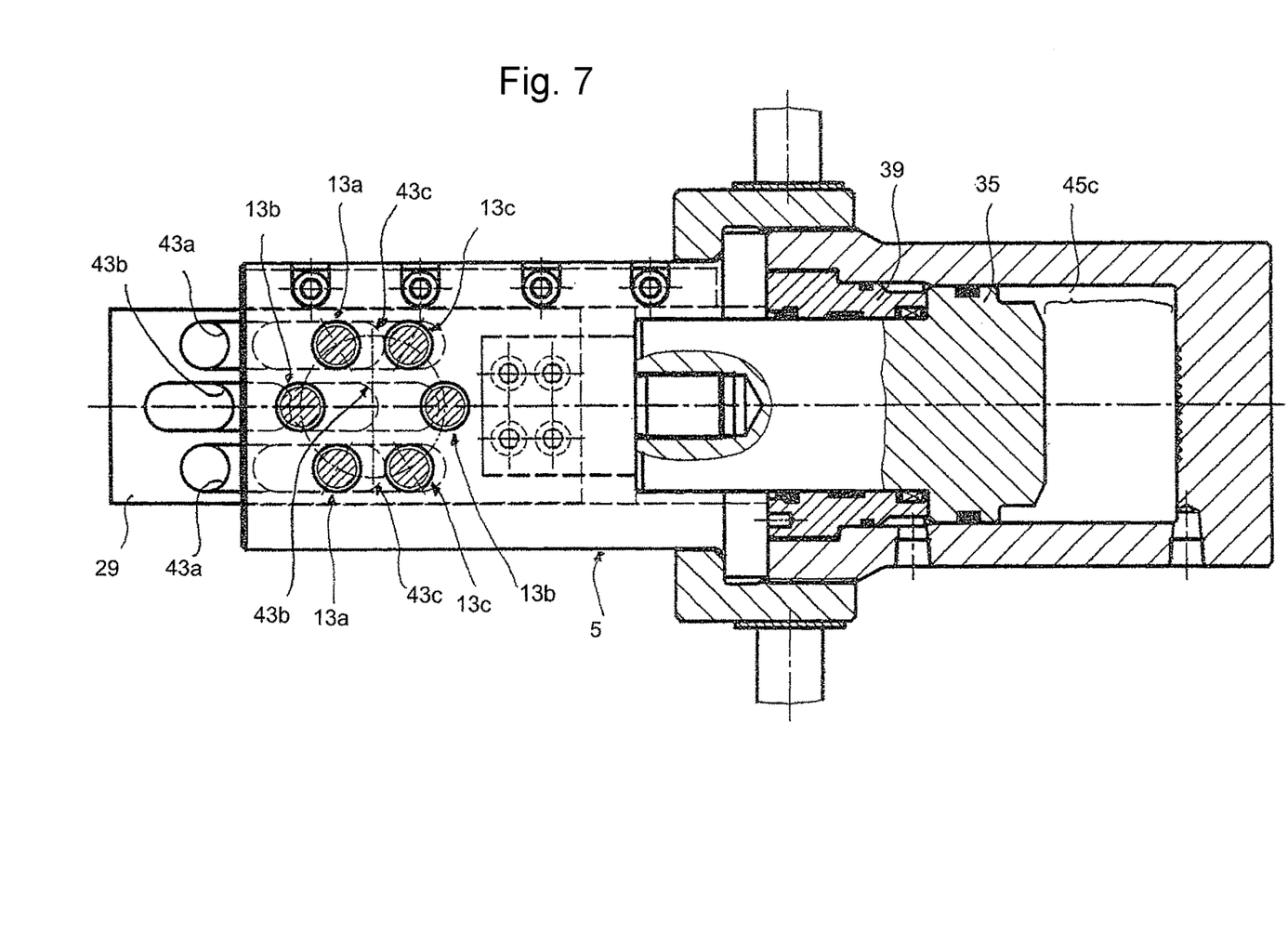
FIG. 7 shows a cross-sectional view of FIGS. 2, 5 and 6 in a further alternative operating condition.

When the cutting body 29 is moved further in the direction into the position shown in FIG. 7 from the condition shown in FIG. 6 by means of pressurization of the piston 35, the third cutting edges 43c are also brought directly into contact with the stranded tensioning wires in the third passage openings 13c. FIG. 7 shows the condition in which the third cutting edges 43c have also completely transited the third passage openings 13c. All six stranded tensioning wires of the bundle thereof are completely severed in the condition shown in FIG. 7.

Preferably the condition shown in FIG. 7 is repeatedly established, in that the position of the cutting body 29 relative to the housing 3 and in particular the first portion 5 of the housing is fixed in a second end position. That is preferably effected by the support ring 39 defining an abutment relative to the piston 35 and by the piston 35 assuming its second end position in the position of the cutting body 29 in which complete severing of the stranded wires is effected. In the position shown in FIG. 7 the piston 35 is moved out of its first end position by the distance 45c.

While the embodiment of FIGS. 1 to 8 is directed exclusively to a stranded tensioning wire severing apparatus for six stranded tensioning wires, for reasons of clarity of the drawing, it will be apparent that differing configurations are also embraced by the scope of the invention. These also include in particular configurations of a stranded tensioning wire severing apparatus which is adapted to sever bundles of stranded tensioning wires comprising more or fewer than six stranded wires, for example nine or twelve stranded wires. For that purpose the housing of the stranded tensioning wire severing apparatus 1, in particular the first portion 5 of the housing, is modified in such a way that, instead of six passage openings, there is a corresponding number of passage openings in the housing. Adaptation of the cutting body is effected to correspond to the number of stranded wires to be severed. Preferably a respective plurality of stranded wires is simultaneously severed by the cutting body while other stranded wires are not yet severed or have already been severed. The combination of respective pairs, triplets or quadruplets of stranded wires seems desirable, in dependence on how much stroke movement of the cutting body and/or how much drive power is available.

Adaptation of the pattern 15 of passage openings 13 to the shape and in particular the part-circular diameter of the bundle of stranded tensioning wires makes it possible to approach very close to the location at which the bundle of stranded tensioning wires is anchored in the structure, with the stranded tensioning wire severing apparatus, as there is no need for the bundle to be expanded to any degree worth mentioning. Nonetheless it may be desirable, in operation of the stranded tensioning wire severing apparatus, to leave a certain residual length of the stranded tensioning wire elements which are passed through the anchoring device, so that they can possibly be re-tensioned.

The stranded tensioning wire severing apparatus according to one embodiment of the invention ensures in particular severing of a plurality of stranded tensioning wires in a bundle thereof to substantially the same length or in a cutting plane. If different cutting planes are wanted, that can be afforded by a suitable configuration in respect of the cutting edge positions in the cutting plate of the cutting body. According to the one embodiment of the invention the cutting body is a replaceable part which can be exchanged inexpensively and involving a small amount of work, after it has worn.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A stranded tensioning wire severing apparatus adapted to sever a plurality of stranded tensioning wires of a wind power installation, the stranded tensioning wire severing apparatus comprising:
   a housing having a slot,
   the slot having a contour surrounded by the housing;
   a cutting body arranged within the slot of the housing, the cutting body including a plurality of through apertures having inclined cutting edges relative to a lower surface of the cutting body, respectively, the cutting body being configured to move along slide rails within the slot of the housing in a cutting direction, and a
   plurality of passage openings in the housing, the plurality of openings being configured to receive the plurality of stranded tensioning wires of the wind power installation, wherein the cutting body is configured to move through the slot in such a way that the inclined cutting edges travel through the plurality of passage openings, respectively, and are configured to sever the plurality of stranded tensioning wires, respectively.

2. The stranded tensioning wire severing apparatus according to claim 1 wherein the plurality of passage openings are arranged uniformly along a circumference of the housing.

3. The stranded tensioning wire severing apparatus according to claim 1 wherein the plurality of cutting edges are displaced relative to each other in the cutting direction in such a way that upon moving the cutting body a first distance at least some of the plurality of cutting edges travel through at least a portion of a first set of the plurality of passage openings simultaneously.

4. The stranded tensioning wire severing apparatus according to claim 3 wherein upon moving the cutting body a second distance that is greater than the first distance, at least some of the plurality of cutting edges travel through at least a portion of a second set of the plurality of openings.

5. The stranded tensioning wire severing apparatus according to claim 4 wherein the plurality of cutting edges are displaced relative to each other in the cutting direction in such a way that the plurality of cutting edges travel through at least a portion of a third set of the plurality of passage openings.

6. The stranded tensioning wire severing apparatus according to claim 4 wherein at the second distance the respective cutting edges have traveled through at least 50% of the first set of the plurality of passage openings.

7. The stranded tensioning wire severing apparatus according to claim 1 further comprising guide portions configured to guide the stranded tensioning wires through the plurality of passage openings in the housing.

8. The stranded tensioning wire severing apparatus according to claim 1 wherein the plurality of cutting edges are curved and form a circular arc that corresponds to a dimension of the plurality of through apertures, respectively, wherein when the cutting body is moved with a translatory movement in the cutting direction each of the plurality of stranded tensioning wires are simultaneously severed.

9. The stranded tensioning wire severing apparatus according to claim 8 wherein the cutting body is coupled to a drive means by a screw connection and driven by the drive means.

10. The stranded tensioning wire severing apparatus according to claim 9 wherein the cutting body has limited movement in the slot of the housing when the cutting body is coupled to the drive means and is removable from the slot of the housing when the cutting body is in a condition of being uncoupled from the drive means.

11. The stranded tensioning wire severing apparatus according to claim 9 wherein the screw connection defines a screw pattern and the housing includes a through bore pattern that corresponds to the screw pattern and wherein the housing is configured to be oriented in aligned relationship with the screw pattern when the cutting body is moved into a particular position within the housing.

12. The stranded tensioning wire severing apparatus according to claim 9 wherein the drive means is a piston in a piston chamber that is hydraulically actuated to drive the cutting body so that the cutting body moves linearly through the slot for severing the plurality of stranded tensioning wires.

13. The stranded tensioning wire severing apparatus according to claim 1 comprising the slide rails within the slot are adjacent to the cutting body, the slide rails being configured to guide the cutting body.

14. The stranded tensioning wire severing apparatus according to claim 1 wherein a first portion of the housing is cylindrical, the first portion including the plurality of passage openings and the slot, wherein the slot is linear, the housing including a second portion that is removably fixed to the first portion.

* * * * *